March 10, 1931.  G. F. BLUME  1,795,992
ROLLER BEARING
Original Filed Nov. 1, 1928
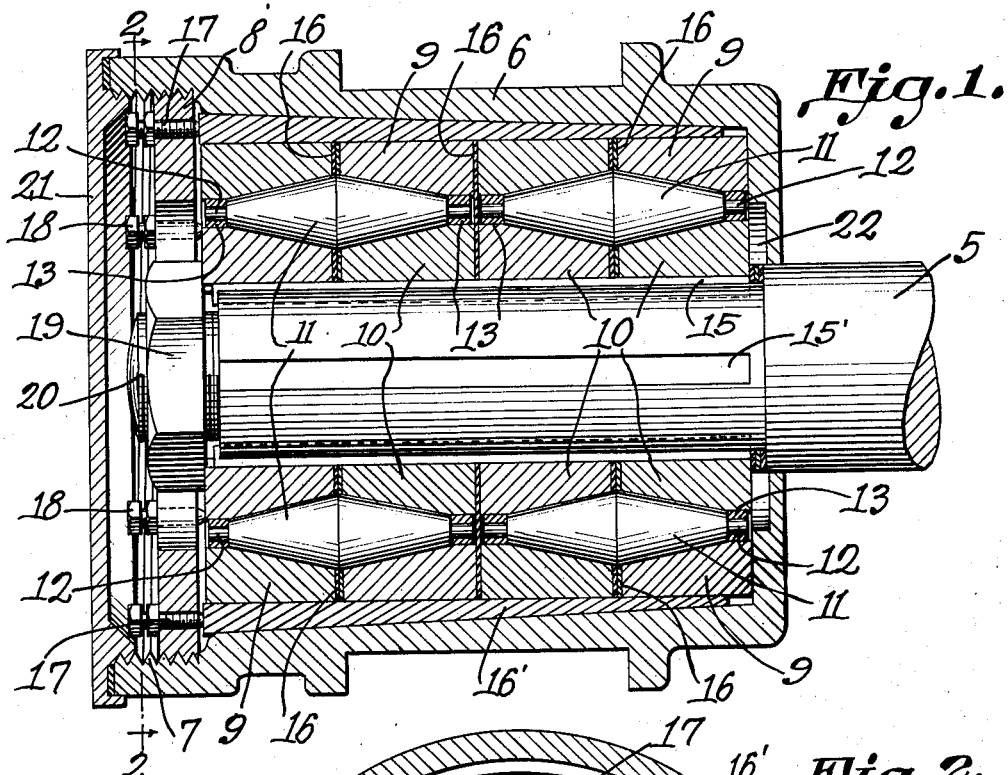
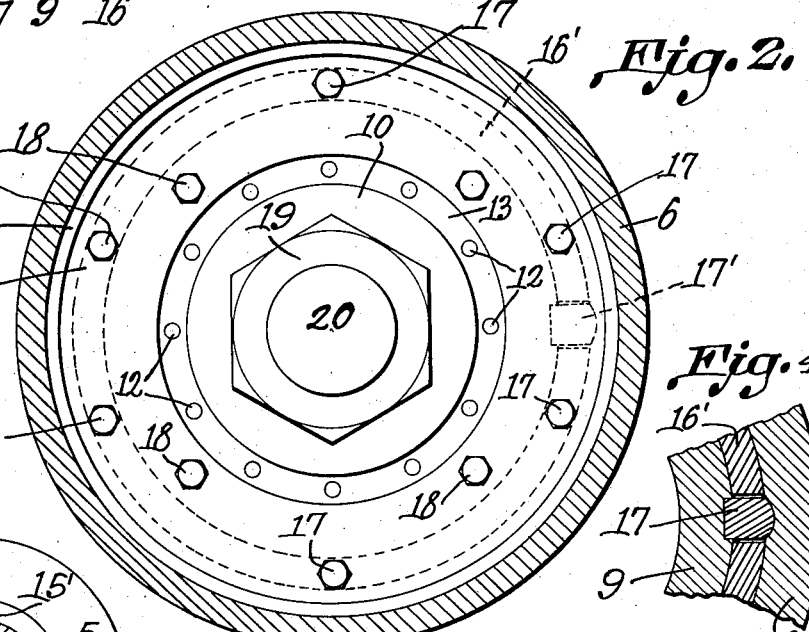
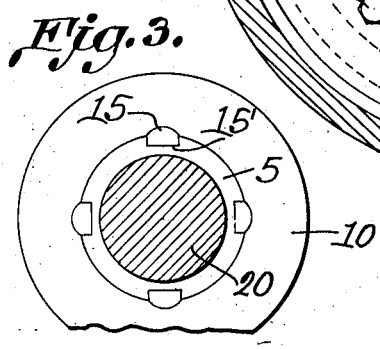
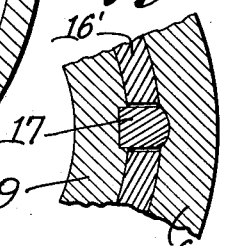
George F. Blume, Inventor Patented Mar. 10, 1931

1,795,992

UNITED STATES PATENT OFFICE

GEORGE F. BLUME, OF PHILADELPHIA, PENNSYLVANIA

ROLLER BEARING

Application filed November 1, 1928, Serial No. 316,425. Renewed January 28, 1931.

This invention relates to bearings especially designed for railway rolling stock, and aims to provide a roller bearing of the tapered construction combining the features of a roller bearing and a thrust bearing.

An important object of the invention is to provide a bearing of this type which may be readily and easily adjusted when the bearing becomes worn, thereby insuring a true bearing at all times.

A further object of the invention is to provide a sectional race or course for the rollers, so that tapered rollers may be used as a bearing.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a longitudinal sectional view through a bearing constructed in accordance with the invention.

Figure 2 is a sectional view taken on line 2—2 of Figure 1.

Figure 3 is an end view of the inner lower races.

Figure 4 is a fragmental sectional view through the retaining sleeve and key.

Referring to the drawing in detail, the reference character 5 designates an axle, with which the bearing, forming the subject matter of this invention, is used.

The bearing housing is indicated by the reference character 6, and has internal threads 7 formed at one end thereof to cooperate with the threads of the retaining ring 8.

Positioned within the housing, are the outer roller races 9 and inner roller races 10, each race embodying sections formed with inclined surfaces that cooperate with the inclined surfaces of the rollers 11, which as shown are tapered towards their ends.

These rollers 11 have shafts 12 formed at their ends, which shafts are mounted in suitable openings formed in the rings 13 that are positioned between the outer and inner roller races. The inner roller races 10 are formed with keyways 14 that accommodate the keys 15 which are fitted in grooves formed longitudinally of the axle 5, as clearly shown by Figure 1, the grooves being indicated by the reference character 15'. Positioned between the outer roller races 9 and housing 6, is a split sleeve 16' which is forced inwardly by the bolts 17 that pass through the retaining ring 8. A tapered key 17' is positioned within the split portion of the sleeve 16' to expand the sleeve to its proper position.

Spacing liners 16 are disposed between the sections of the inner and outer roller races to hold the sections of the inner and outer races in proper spaced relation. Threaded bolts 18 extend through the retaining ring 8 and bear against the inner roller races to hold them in position. It is of course understood that lock nuts are provided on the bolts 17 and 18 to hold them in their positions of adjustment.

The reference character 19 designates a nut positioned on the threaded extremity 20 of the axle 5, the nut engaging the outer surface of one section of the inner roller race to hold the roller races against outward movement, or movement longitudinally of the axle 5.

A cap indicated at 21 closes one end of the housing and retains the lubricant in the housing, and at the same time prevents foreign matter from entering the housing to damage the bearing.

A recess 22 is formed within the housing, and defines a pocket for the reception of lubricating material so that the roller bearings are maintained in a lubricated condition at all times.

I claim:

1. In a device of the character described, a housing, an axle extending into the housing, outer and inner roller races within the housing, rollers mounted between the outer and inner roller races, a split sleeve disposed between the outer roller races and the housing, a key positioned between the ends of the split sleeve to hold the sleeve against rotary movement with respect to the roller races and housing to lock the roller races against movement, and adjusting members at the outer ends of the roller races to adjust the roller races longitudinally of the housing, and a cover at one end of the housing.

2. In a device of the character described, a housing, an axle extending into the housing, outer and inner roller races within the housing, rollers mounted between the outer and inner roller races, the inner surface of the housing being tapered, a tapered split sleeve disposed between the outer roller races and housing, means for adjusting the split sleeve longitudinally of the housing, a key disposed between the ends of the split sleeve for expanding the sleeve, to lock the sleeve in position, and a cover at one end of the housing.

In testimony that I claim the foregoing as my own, I have hereto affixed my signature.

GEORGE F. BLUME.